United States Patent
Kostello et al.

(10) Patent No.: US 8,745,500 B1
(45) Date of Patent: Jun. 3, 2014

(54) VIDEO EDITING, ENHANCEMENT AND DISTRIBUTION PLATFORM FOR TOUCH SCREEN COMPUTING DEVICES

(71) Applicant: VMIX Media, Inc., San Diego, CA (US)

(72) Inventors: Gregory Paul Kostello, San Diego, CA (US); Sean Michael Meiners, San Diego, CA (US); Timothy Allan Flack, San Diego, CA (US); Joshua Aaron Gaines, Oceanside, CA (US); Scott Wayne Gay, San Diego, CA (US); Philip Chen, Carlsbad, CA (US); Lonnie Jay Brownell, Encinitas, CA (US); Julian Jimenez Santos, III, San Diego, CA (US)

(73) Assignee: VMIX Media, Inc., San Diego, CA (US)

( * ) Notice: Subject to any disclaimer, the term of this patent is extended or adjusted under 35 U.S.C. 154(b) by 0 days.

(21) Appl. No.: 13/710,317

(22) Filed: Dec. 10, 2012

(51) Int. Cl.
G06F 3/00 (2006.01)

(52) U.S. Cl.
USPC ............................ 715/723; 715/719; 386/282

(58) Field of Classification Search
None
See application file for complete search history.

(56) References Cited

U.S. PATENT DOCUMENTS

| | | | |
|---|---|---|---|
| 2007/0074115 A1* | 3/2007 | Patten et al. | 715/716 |
| 2010/0107080 A1* | 4/2010 | Bentley et al. | 715/723 |
| 2012/0096357 A1* | 4/2012 | Folgner et al. | 715/726 |
| 2012/0166950 A1* | 6/2012 | Frumar et al. | 715/719 |
| 2012/0308209 A1* | 12/2012 | Zaletel | 386/278 |
| 2013/0166390 A1* | 6/2013 | Blow et al. | 705/14.66 |

OTHER PUBLICATIONS

Stanek, William R.; "Windows 7: The Definitive Guide"; Oct. 2009; O'Reilly; pp. 379-443.*
Ozer, Jan; "Microsoft Windows Movie Maker 2: Visual Quickstart Guide"; May 2004; Peachpit; pp. 234-254.*

* cited by examiner

*Primary Examiner* — Stephen Hong
*Assistant Examiner* — Asher Kells
(74) *Attorney, Agent, or Firm* — Mintz Levin Cohn Ferris Glovsky and Popeo, P.C.

(57) ABSTRACT

A window displaying at least one video clip and at least one highlight element is presented in a graphical user interface on a mobile device having a touch screen interface. Thereafter, user-generated input is received via the graphical user interface selecting one of the at least one highlight element during display of the at least one video clip. In response to the user-generated input, at least one thumbnail is displayed (concurrently with the window in the graphical user interface) that corresponds to a segment of the video clip being displayed. A video file is then generated or modified that includes for at least one thumbnail, the corresponding segment of the video clip. Related apparatus, systems, techniques and articles are also described.

18 Claims, 10 Drawing Sheets

;# VIDEO EDITING, ENHANCEMENT AND DISTRIBUTION PLATFORM FOR TOUCH SCREEN COMPUTING DEVICES

TECHNICAL FIELD

The subject matter described herein relates to a video editing, enhancement, and distribution platform for use with touch screen computing devices such as mobile phones and tablet computers.

BACKGROUND

The proliferation of video-enabled smart phones and tablet computers has resulted in individuals accumulating large collections of video files. As is typical with most video footage, significant post-processing effort is required to assemble and/or edit important clips from such footage. Resources for such post-processing on touch screen computing devices are limited and/or not user-friendly. As a result, most video editing is performed on laptop/desktop computers using specialized video editing software.

SUMMARY

In one aspect, a window displaying at least one video clip and at least one highlight element is presented in a graphical user interface on a mobile device having a touch screen interface. Thereafter, user-generated input is received via the graphical user interface selecting one of the at least one highlight element during display of the at least one video clip. In response to the user-generated input, at least one thumbnail is displayed (concurrently with the window in the graphical user interface) that corresponds to a segment of the video clip being displayed. A video file is then generated or modified that includes for at least one thumbnail, the corresponding segment of the video clip.

The at least one highlight element can include an instant highlight element, the instant highlight element, when activated, causes at pre-defined time period of the video clip prior to such activation to be marked as a highlight with a corresponding thumbnail. The at least one highlight element can include a start highlight element, the start highlight element, when first activated, marks a first point a time, and when second activated marks a second point of time, the first point of time and the second point of time defining a time period for a highlight, the highlight having a corresponding thumbnail.

The window displaying the at least one video clip can display a video feed as it is being captured by a camera on the mobile device and/or at least one video clip from a previously generated video file.

A plurality of thumbnails corresponding to each of a plurality of available video clips can be presented in the interface. Thereafter, user-generated input is received the graphical user interface that comprises an ordered selection of two or more of the thumbnails. This selected ordering can be used to concatenate video clips corresponding to the thumbnails during the display of the at least one video clip.

The graphical user interface can include a timeline that is displayed concurrently with the display of the at least one video clip. The timeline can provide visual characterization of temporal advancement of the at least one video clip.

At least one visual effects palette can be displayed in the graphical user interface that includes a plurality of visual effects elements. Each visual effects element can correspond to visual effects to be applied to a segment of the at least one video clip. Thereafter, user-generated input can be received via the graphical user interface selecting at least one thumbnail and at least one visual effects element. With such scenarios, the generated or modified file applies visual effects corresponding to the selected at least one visual effects element to the segment corresponding to the selected at least one thumbnail. Various visual effects can correspond to the visual effects elements. Examples include, but are not limited to: reduced playback speed, increased playback speed, at least one replay of a segment, at least one visual overlay, at least one change of color of a segment.

At least one transitions palette can be displayed in the graphical user interface that include a plurality of transition elements. Each transition element can correspond to transition effects to be applied when transitioning between segments of the at least one video clip. User-generated input can be received via the graphical user interface selecting at least one thumbnail and at least one transition element. With such scenarios, the generated or modified file applies transition effects corresponding to selected at least one transition element to the segment corresponding to the selected at least one thumbnail. Various types of transition effects can be used. Examples include, but are not limited to: fade to black effect, cross dissolve effect, jump cut effect, jump to black effect, slide left effect, slide right effect, zoom in effect, a zoom out effect, a zoom and slide left effect, and a zoom and slide right effect.

At least one audio effects palette can be displayed in the graphical user interface comprising a plurality of audio effects elements. Each audio effect element can correspond to audio effects to be applied to a segment of the at least one video clip. User-generated input can be received via the graphical user interface selecting at least one thumbnail and at least one audio effects element. With such a scenario, the generated or modified file applies audio effects corresponding to the selected at least one audio affects element to the segment corresponding to the selected at least one thumbnail.

An adjustable volume control element can also be displayed within the graphical user interface. User-generated input can be received via the graphical user interface during playback of the at least one video clip varying a level of the adjustable volume control element. With such a scenario, the generated or modified file varies a volume level of an audio portion of the at least one video clip according to the varied level of the adjustable volume control element.

The video files as well as other data generated can be provided via various modalities. Providing data in this regard can include one or more of transmitting data characterizing the generated or modified video file, displaying data characterizing the generated or modified video file, storing data characterizing the generated or modified video file, and uploading data characterizing the generated or modified video file to at least one social network platform. Unless specified otherwise, data characterizing the generated or modified video file can include the video file itself. The generated or modified video file can form a unitary data file. Te generated or modified video file can comprise at least two related, but separate, data files. For example, one file may encapsulate metadata associated with the other file, etc.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter enables a user to more readily edit/enhance video taken and/or stored on their mobile devices. Further, such editing and enhancements can be performed in real-time or it can be done as part of a post-video shoot editing process.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter provides a video editing, enhancement, and distribution platform for use with touch screen interface computing devices such as mobile phones and tablet computers (collectively referred to herein as "mobile devices"). As will be described in further detail below, the platform can be used to both provide real-time editing and enhancement of video files (i.e., while the video file is being created via the camera on the mobile device) and/or it can edit and enhance previously generated video files (whether created on the mobile device or otherwise) via specialized graphical user interfaces. In addition, the platform provides a mechanism to share video files (whether enhanced, edited, or otherwise) across various distribution mechanisms including e-mail, messaging, web, and online social networks.

The platform can take many forms including a software application or suite of applications (collectively referred to herein as an "app") that can be downloaded to a mobile device. The functionality of the platform can, in some implementations, reside solely in the app, while in other implementations, the functionality can be provided by a combination of the app and one or more remote servers that are accessible to the mobile device via a communications network such as the Internet, cellular networks, WiFi, Bluetooth, and the like.

FIGS. 1-8 illustrate views of one implementation of the platform. It will be appreciated that the various features and functions can be implemented singly, in the combination described and illustrated, or in different combinations that exclude one or more of the features and functions. For example, various editing and enhancement features can be provided without the ability to capture and/or enhance live video. In addition, while FIGS. 1-7X relate to a mobile phone app, other types of platforms can be used such as tablet computers (and in some cases, computers having non-touch screen interfaces).

Figure 1:
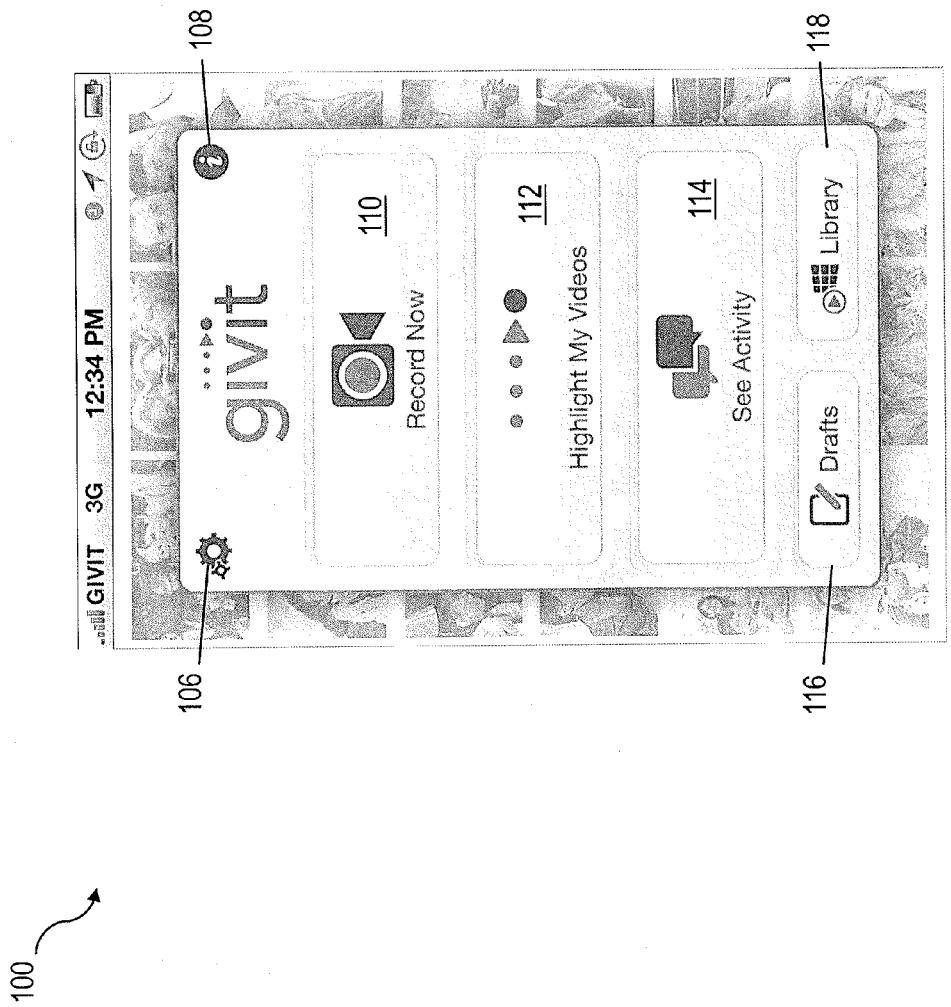
FIG. 1 is a diagram illustrating a navigation interface.

FIG. 1 is a view 100 illustrating a menu interface 102 that includes graphical user interface elements 106-118 (sometimes simply referred to as elements) for providing various functions overlaid on a skin 104. These and other elements described in this application can be activated via various mechanisms such as tapping, depressing for a pre-defined time period, swiping, and the like. A settings element 106, which when activated, results in a view being presented that allows a user to define or modify one or more operational parameters/settings associated with the platform (e.g., push notifications, linking to social networks, username/password, etc.). An information element 108, which when activated, results in a view being presented that provides further information regarding the platform to the user (e.g., number of videos, version, etc.). The record now element 110, which when activated, results in the user being presented with a view 200A, 200B for capturing video such as the ones illustrated in FIGS. 2A-2B (which will be described in further detail below). The highlight my video element 112, which when activated, results in the user being presented with a view such as the one illustrated in FIG. 3 (which will be described in further detail below). The see activity element 114, which when activated, results in the user being presented with a view such as the one illustrated in FIG. 8 (which will be described in further detail below). The drafts element 116, which when activated, results in the user being presented with a view showing videos that are in the process of being edited/enhanced. The library element 118, which when activated, results in the user being presented with a view listing or showing thumbnails or previews of previously edited/enhanced videos.

Figure 2A:
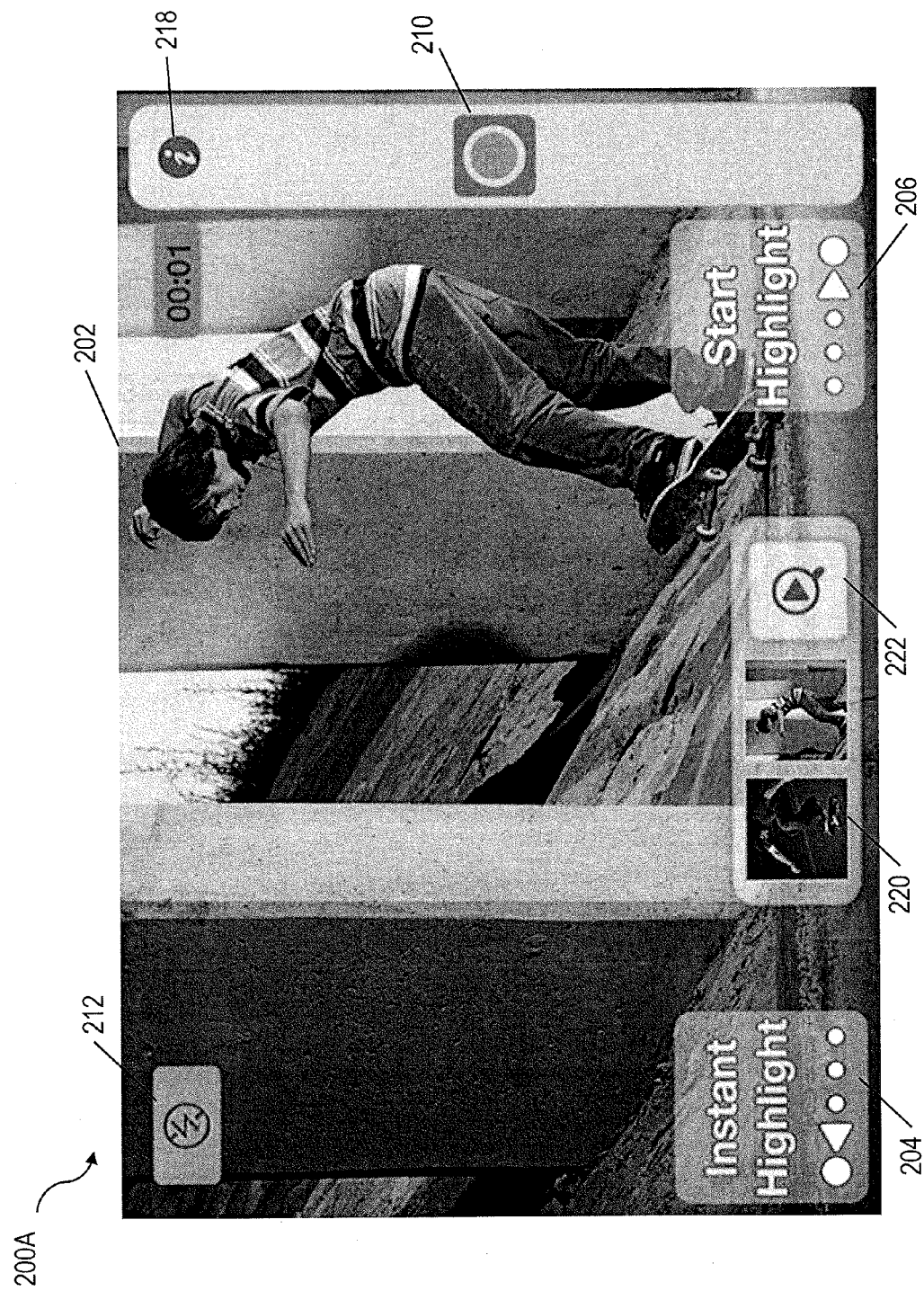
FIG. 2A is a diagram illustrating highlighting of a video clip.
Figure 2B:
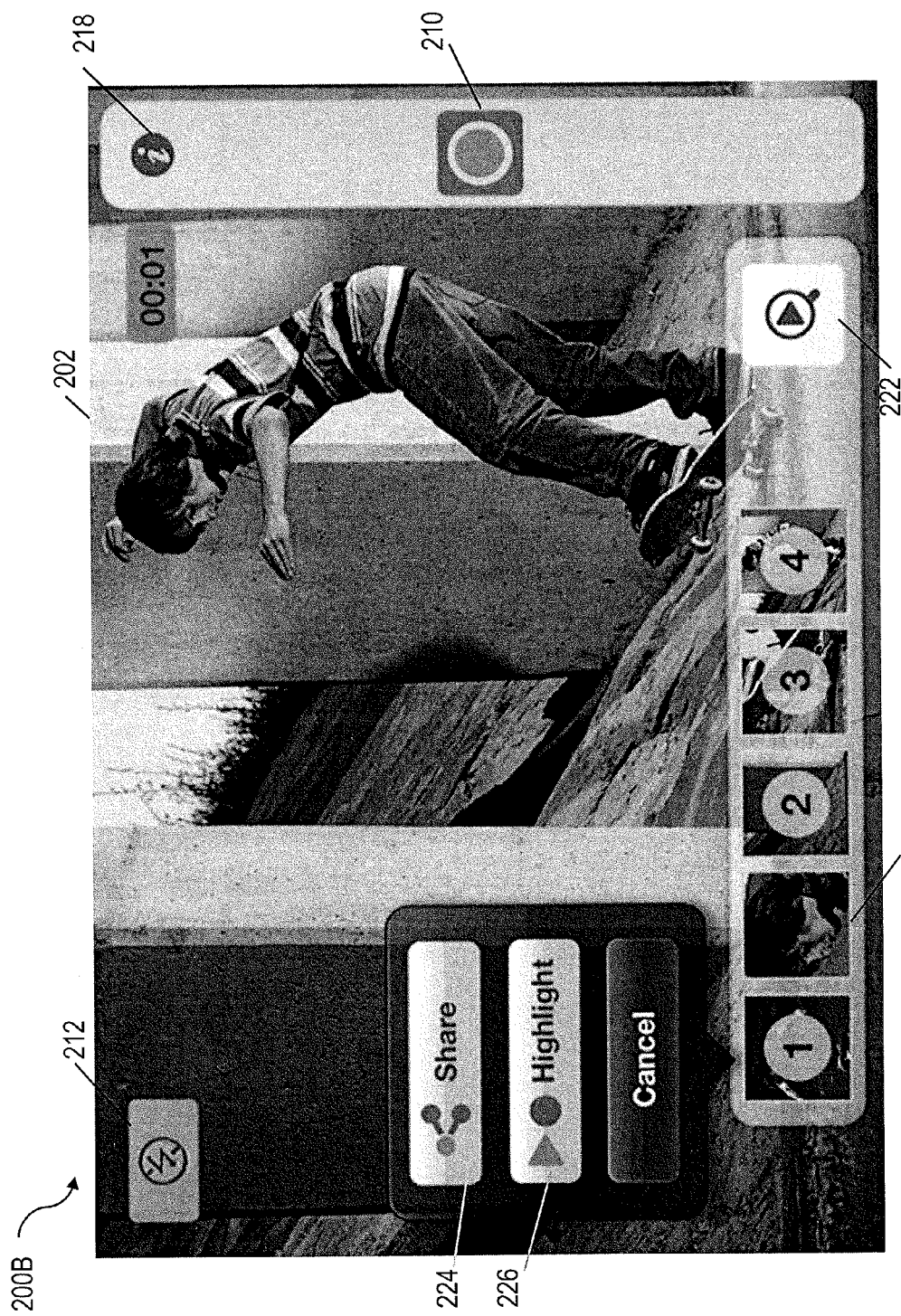
FIG. 2B is a diagram illustrating highlighting of live video capture.

FIGS. 2A-2B are views 200A, 200B for capturing video. The main window 202 shows a real-time video feed taken from the mobile device (either from a rear facing camera or via a front facing camera, the latter being activated via a reverse camera element 214). In addition, in some cases a flash element 212 can be activated to cause the mobile device to illuminate the area viewed by the camera. With such an arrangement, recording a video can be commenced by activating a record element 210. During the pendency of the video, a timer 216 can be displayed. In addition, an information element 218 can be included, which when activated, either overlays information about how to use the particularly displayed interface or a different view is presented with information on how to use the record now feature. Thumbnails 220 of previously generated clips can also be displayed which when activated cause the corresponding clip to be played.

Once recording of a video has commenced, a user can activate an instant highlight element 204 and/or a start highlight element 206. The instant highlight element 204 causes a pre-defined amount of time prior to the activation of the element 204 to be highlighted. For example, the previous seven seconds can be highlighted, or in cases in which less than seven seconds of time has elapsed, the entire portion of the video prior to the activation of the instant highlight element 204. The start highlight element 206 when activated can allow subsequently recorded video to be highlighted until the earlier of the end of the video (by either exiting the application or by activating the record element 210 a second time) or a second activation of the start highlight element 206.

With reference to diagram 200B of FIG. 2B, when the user pauses the recording, he or she may do one of five things. First, the user can begin/resume to create a new video clip with a corresponding thumbnail. The highlighting will then apply to the new recording. Second, the users can preview the highlight by pressing on a play button 222. Third, the user can remove or add a highlight by toggling on a corresponding thumbnail 220. Fourth, the user can edit the video clips by activating, for example, a highlight element 226. Fifth, the user can activate a share button 224 to share the corresponding clip via one of a variety mechanisms (messaging, social networks, e-mail, etc.).

Highlighting, as described herein, can comprise any sort of visual, audial, or audiovisual treatment given to a particular segment of a video clip. Highlighting can also simply identify certain portions of a video clip without modifying any aspect of the subject matter being presented during the video clip. Highlighting can be integral to a video clip (i.e., it is included in a unitary file) or it can be a separate file that is associated with the file(s) for the video clip. As will be described in further detail below, the highlighting and related enhancements can, in some cases, be viewed in standard video players available on mobile devices, while in other cases, can be viewed in specialized video players that consume metadata generated using the platform.

Figure 3:
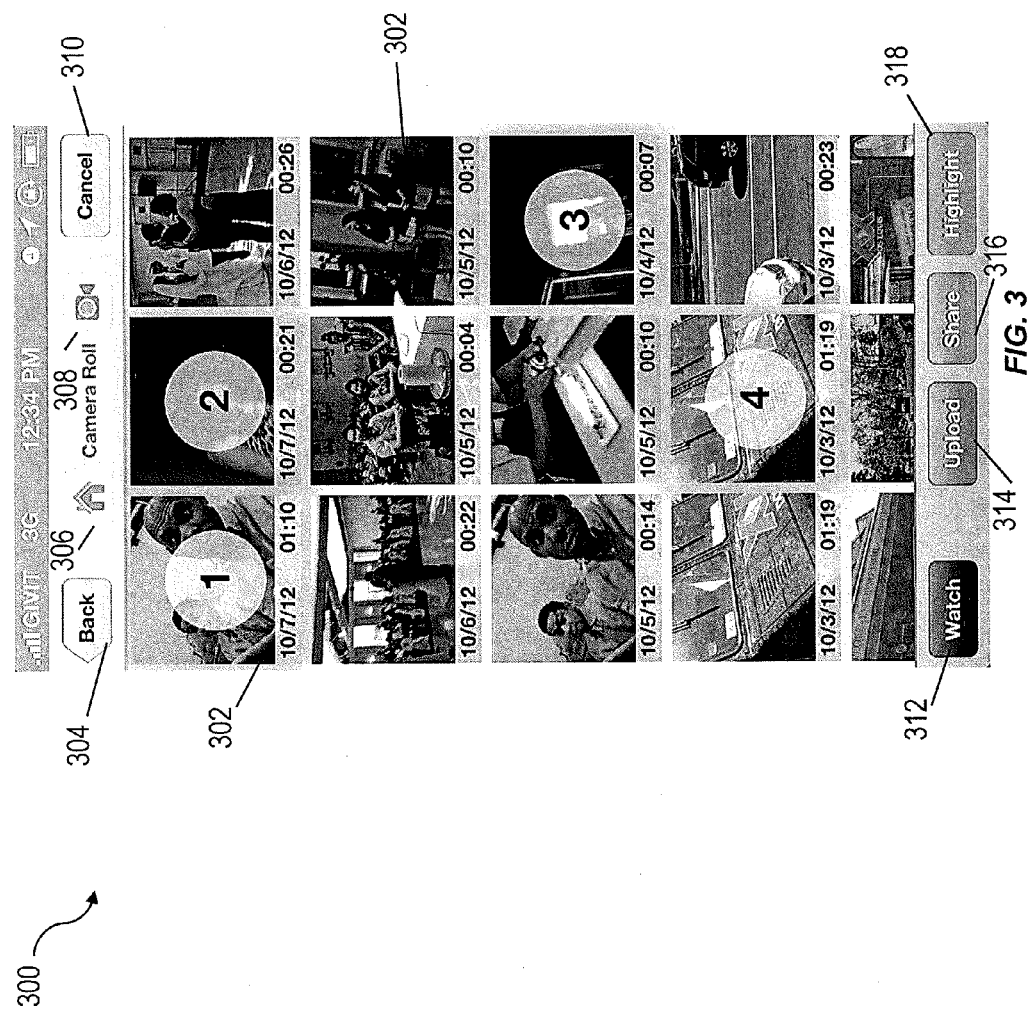
FIG. 3 is a diagram illustrating an order selection of multiple video clips to be highlighted and/or enhanced.

FIG. 3 is a view 300 which can be presented, for example, after the activation of the highlight my videos element 112. This view 300 comprises a plurality of thumbnails 302 that each correspond to previously recorded video clips. Each thumbnail can include descriptive information such as date, time, length, title and the like. In addition, a back element 304 can be provided that causes the current view to be replaced with the most recent preceding view. A home page element 306 when activated can cause view 100 of FIG. 1 to be presented. The camera element 308 when activated can cause the view 200A of FIG. 2 to be presented. Similarly, the cancel element 310 can cause the current view 300 to be replaced with another view such as view 100. A watch element 312 when activated can allow a user to preview/watch the video clips corresponding to any selected thumbnails 302. An upload element 314 when activates can allow a user to upload a video to the application. A share element 316 when activates can allow a user to share a video clip to one or more users via varying modalities (e.g., posting, e-mail, social networks, messaging, etc.). A highlight element 314 when activated can allow a user to highlight one or more of the video clips corresponding to any selected thumbnails 302.

In some implementations, multiple video clips can be edited/enhanced. For example, multiple video clips or portions thereof can be concatenated into a single clip or a series of linked clips. In such cases, the thumbnails 302 can be selected (i.e., activated) so as to order the clips. For example, a user can first depress thumbnail 302-1 which results in it includes a designator (1) overlaying the thumbnail, followed by a second thumbnail 302-2 which results in designator (2) overlaying the thumbnail, followed by a third thumbnail 302-3 which results in designator (3) overlaying the thumbnail. After the order of the video clips has been specified, a user can select the highlight element 314 which results in a view for highlighting the corresponding video clips (such as illustrated in FIG. 4).

Figure 4:
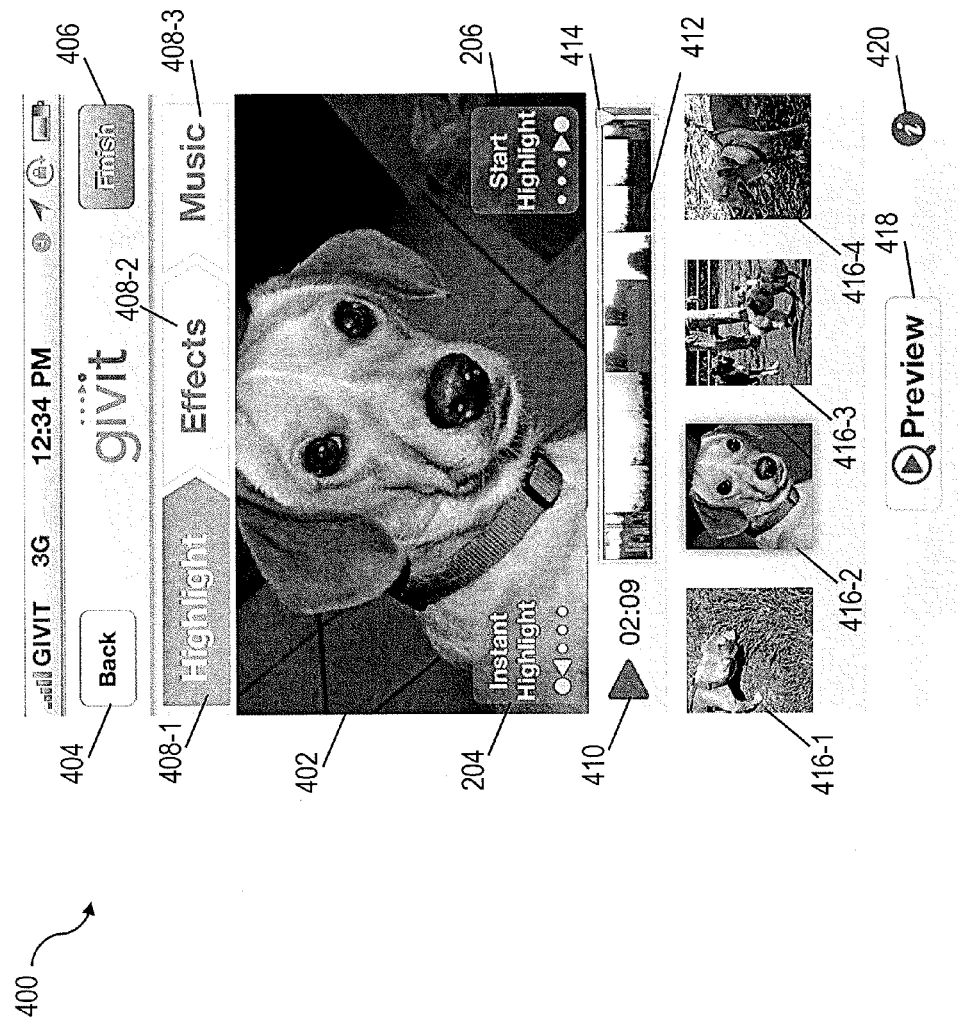
FIG. 4 is a diagram illustrating highlighting of at least one video clip.

FIG. 4 is a view 400 of an interface for highlighting the video clip(S) selected via the thumbnails 302 illustrated in FIG. 3. A window 402 can display the video clip as it is being played. Category elements 408-1, 408-2, and 408-3 can identify which of various enhancement stages are being displayed in the interface, and when activated, can cause the current view to switch to the corresponding category. Similar to that described with regard to live video capture, an instant highlight element 204 and/or a start highlight element 206 can be provided. Both of these highlight elements 204, 206 can be activated during the replay of the video clip(s) as displayed on the window 402. Each time a highlight is initiated via one of the highlight elements 204, 206 a corresponding thumbnail 416 can be displayed below the window 402 within the view 400. As illustrated in FIG. 4, there are four separate highlight thumbnails 416-1, 416-2, 416-3, 416-4 that correspond to four separate highlight segments generated using the highlight elements 204, 206. Activation of graphical user interface elements associated with the thumbnails 416 can cause a corresponding segment of the video clip(s) to be displayed within the window 402 and/or a window corresponding to the such segment to be emphasized/highlighted within the timeline 414 (described below). A user can depress the elements for the thumbnails 416 for a pre-defined period of time to either directly or indirectly delete such thumbnails 416 (and the corresponding highlighting).

In addition, a playback element 410 can be provided that controls the progression of the display of the video playback (e.g., play, pause, stop, etc.). A timer can also be presented adjacent to the playback element that identifies how much time has elapsed in the video clip(s). The interface illustrated in view 400 can also include a timeline 412 that provides a graphical representation of the video clip(s) over the entire duration of such video clip(s). For example, the timeline 412 can comprise a plurality of previews/thumbnails concatenated in relation to temporal occurrence. In addition, a position marker 414 can overlay the timeline 412 and advance corresponding to the elapsed playback time of the video clip (s). In some variations, the timeline can be a slidable element that can allow a user to change the time within the video clip(s) that playback commences/recommences. A preview element 418 can be activated which shows how the video clip(s) appear with the highlighting. Once the highlighting has been finalized, a user can activate a finish element 406 that the video clip(s) with enhancements to be saved, saved and shared, saved and uploaded, and the like.

The interface of view 400 can also include other elements such as a back element 404 which, when activated, can cause the view 400 to be replaced with an immediately preceding view and an information element 420 which, when activated, can cause information about how to use the interface of view 400 to be displayed (whether overlaid on other portions of the interface or by displaying a separate view to be shown).

Figure 5:
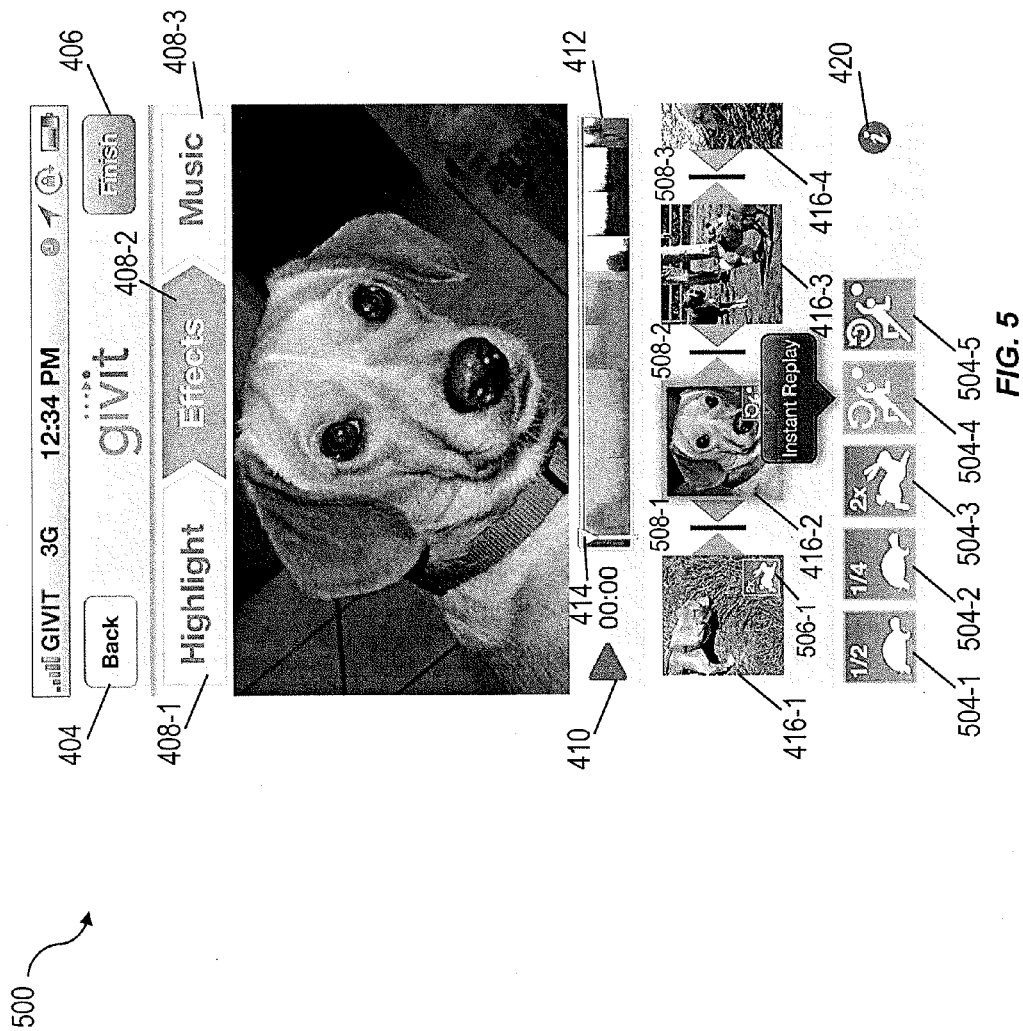
FIG. 5 is a diagram illustrating application of visual effects to at least one segment of the at least one video clip using a visual effects palette.

FIG. 5 is a view 500 of an interface in which the effects category 408-2 is active. With this view, the previously generated thumbnails 416 are displayed concurrently with an effects palette 502 that comprises one or more effects elements 504. The effects elements 504 can correspond to different effects to be applied to one or more of the segments associated with the thumbnails 416. For example, a first effect element 504-1 can be used for playing back the corresponding video segment at half speed, a second effect element 504-2 can be used for playing back the corresponding video segment at quarter speed, a third effect element 504-3 can be used for playing back the corresponding video segment at double speed, a fourth effect element 504-4 can be used to cause the corresponding video segment to be replayed once within the greater video clip (i.e., a single instant replay), and/or a fifth effect element 504-4 can be used to cause the corresponding video segment to be replayed twice within the greater video clip (i.e., a double instant replay), and the like. A segment can be associated with one of the effects by activating both the corresponding thumbnail 416 and a corresponding effects element 504 (the sequence in which the corresponding elements can vary). Between intermediate pairs of adjacent thumbnails are transition elements 508-1, 508-2, 508-3 (which are described in further detail with regard to FIG. 6).

Figure 6:
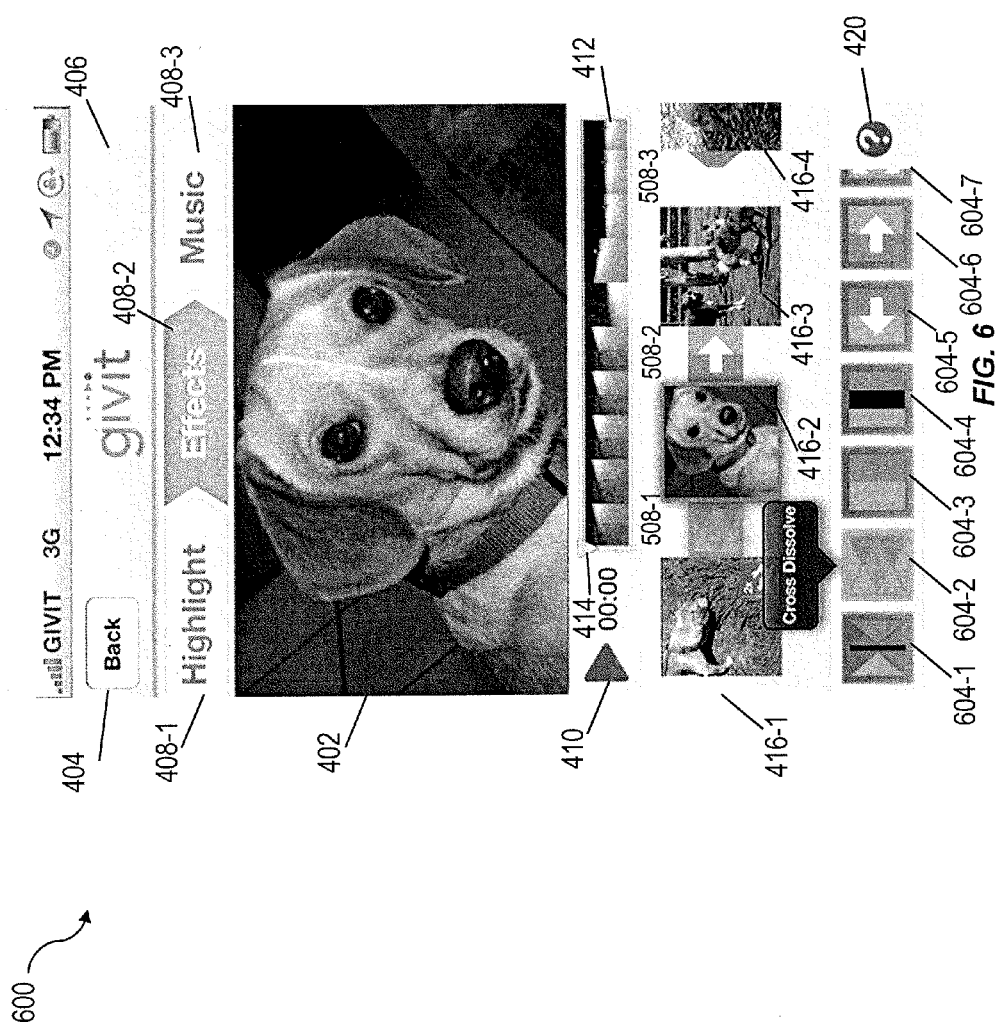
FIG. 6 is a diagram illustrating application of transition effects between at least two segments of the at least one video clip using a transition effects palette.

FIG. 6 is a view 600 in which a transitions palette 602 is illustrated. The transitions palette 602 can be displayed, in response to activation of an existing transition element 508 (either user selected or default) or by a space between two thumbnails 416 (i.e., an invisible element can be provided which responds to activation, etc.). The transitions palette can include a series of transition effects elements 604-1, 604-2, 604-3, 604-4, 604-5, and the like. Transitions in this sense refers to visual effects for transitioning between highlighted segments corresponding to the thumbnails 416. For example, a first transition effects element 604-1 when activated, can cause a transition between two segments corresponding to the thumbnails 416 to be a fade to black effect. A second transition effects element 604-2 when activated, can cause a transition between two segments corresponding to the thumbnails 416 to be a cross dissolve effect. A third transition effects element 604-3 when activated, can cause a transition between two segments corresponding to the thumbnails 416 to be a jump cut effect. A fourth transition effects element 604-4 when activated, can cause a transition between two segments corresponding to the thumbnails 416 to be a jump to black effect. A fifth transition effects element 604-5 when activated, can cause a transition between two segments corresponding to the thumbnails 416 to be a slide left effect. A sixth transition effects element 604-6 when activated, can cause a transition between two segments corresponding to the thumbnails 416 to be a slide right effect. A seventh transition effects element 604-7 when activated, can cause a transition between two segments corresponding to the thumbnails 416 to be a zoom in effect. An eighth transition effects element 604-8 (not shown but accessible via a swipe gesture on the transitions palette 602) when activated, can cause a transition between two segments corresponding to the thumbnails 416 to be a zoom in effect. A ninth transition effects element 604-9 (not shown but accessible via a swipe gesture on the transitions palette 602) when activated, can cause a transition between two segments corresponding to the thumbnails 416 to be a zoom out effect. A tenth transition effects element 604-10 (not shown but accessible via a swipe gesture on the transitions palette 602) when activated, can cause a transition between two segments corresponding to the thumbnails 416 to be a zoom and slide left effect. An eleventh transition effects element 604-11 (not shown but accessible via a swipe gesture on the transitions palette 602) when activated, can cause a transition between two segments corresponding to the thumbnails 416 to be a zoom and slide right effect.

Figure 7:
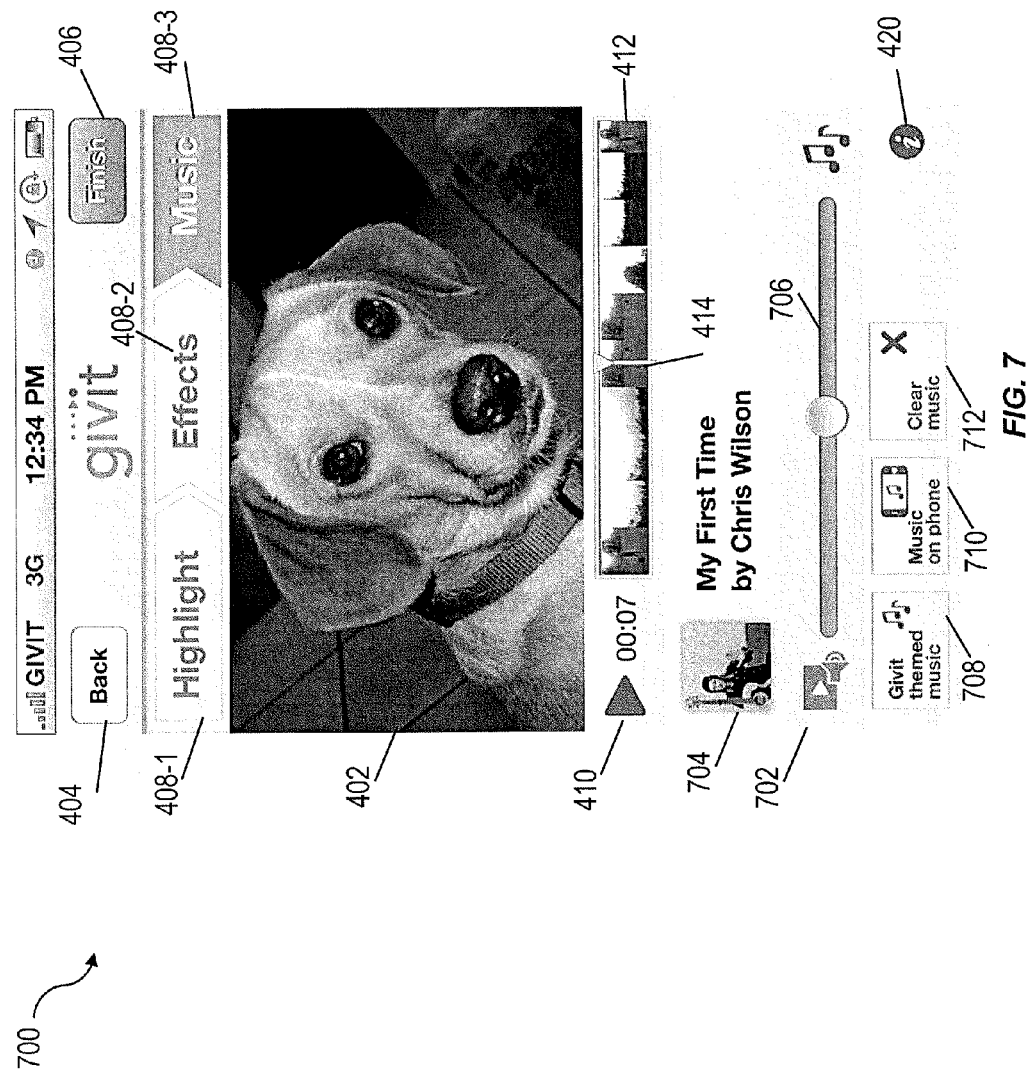
FIG. 7 is a diagram illustrating application of audio effects between at least two segments of the at least one video clip using an audio effects palette.

FIG. 7 illustrates a view 700 of an interface presented when the music category 408-3 is activated. A music palette 700 can be displayed that includes an icon 704 corresponding to an artist, album, or song, a volume slider 706, and music selection elements 708-712. The music selection elements 708-712 can be activated to associate a particular type of audio effect (e.g., themed music 708, user-defined music 710 stored on the mobile device or in the cloud, or no music 712) with either the video clip(s) as a whole, or a segment associated with one of the thumbnails 416. The volume slider 706 can be used to set a volume level of any audio effects. Such volume levels can be static for the entire segment/clip, or it can be variable (such that the user can vary the sound while the segment/clip during playback in the window 402). Once the desired audio effects have been associated with the video clip(s)/segments, the user can then activate the finish element 406 to initiate one of the actions described above.

Once the video clip(s) enhancements are deemed to be finished, a client application residing on the mobile device can encapsulate the highlighting/enhancements into a single video file using a standardized format or, in some implementations, in a proprietary format requiring a specialized video player. Alternatively, multiple files can be generated as a result of the highlighting/enhancement that are associated with each other. During viewing, the various highlights/enhancements are presented seamlessly to a user. For example, a metadata file can be generated in connection with a video file that identifies one or more of the segments, the highlights, the enhancements such as the music and transitions, and the like.

Figure 8:
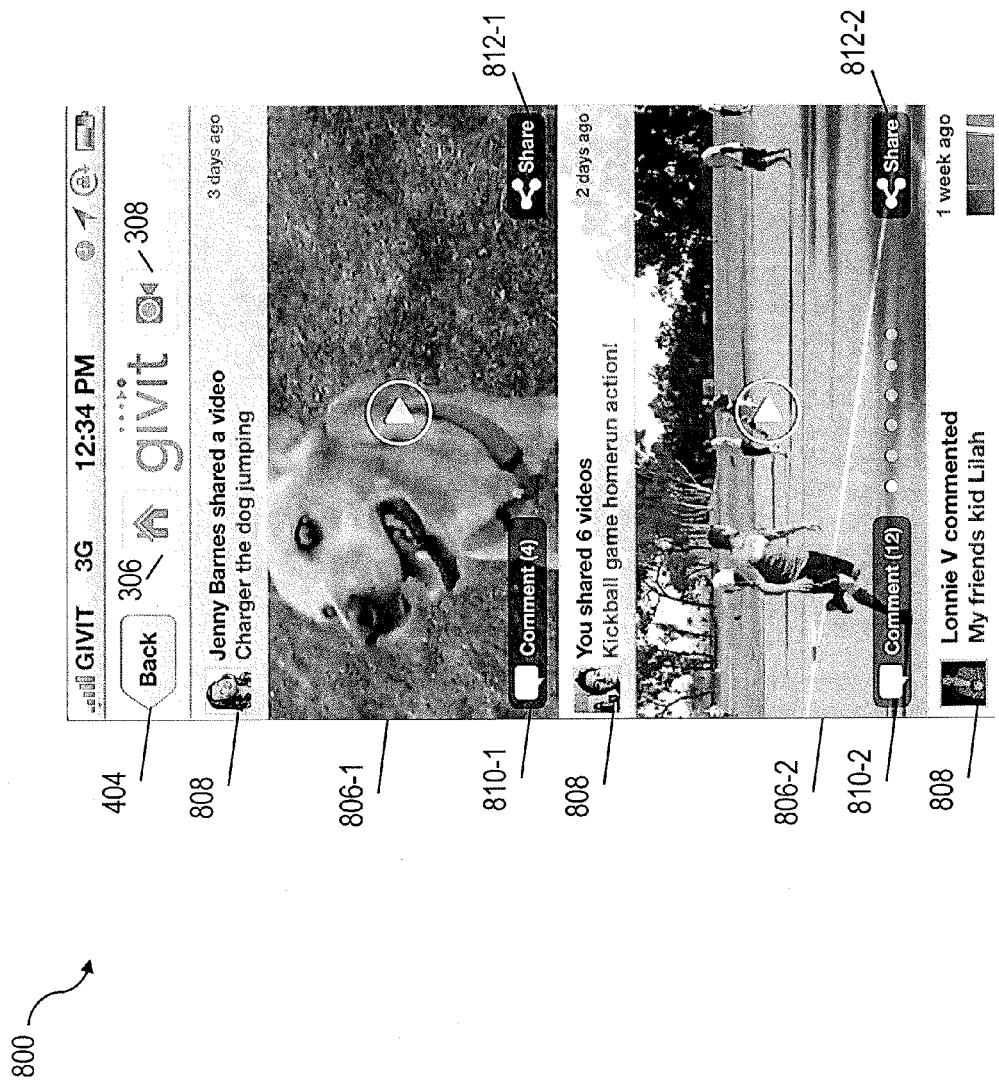
FIG. 8 is a diagram illustrating a sample activity stream illustrating a plurality of highlighted and/or enhanced video clips shared amongst a plurality of users of one or more social networks.

FIG. 8 illustrates a view 800 of an interface that can allow users 808 to share videos. This particular view is of a video stream of friends/connections for a particular user. Within the video stream, there can be one or more video preview elements 806-1, 806-2, which when activated, result in a corresponding video clip to be presented (either in situ or in a different view). Users 808 can provide/review comments via comment elements 810-1, 810-2 and/or share the videos (e.g., send URLs, which when activated, cause the corresponding video clip to be played, etc.) via share elements 812-1, 812-2. In addition, navigation elements can be included such as (i) a home page element 802, which when activated, can cause the interface to revert back to an earlier view (e.g., the home page, etc.) and/or (ii) a record element 804 which when activated causes a view to be presented to allow a user to capture live video (and if desired annotate and/or enhance any corresponding video clips).

Figure 9:
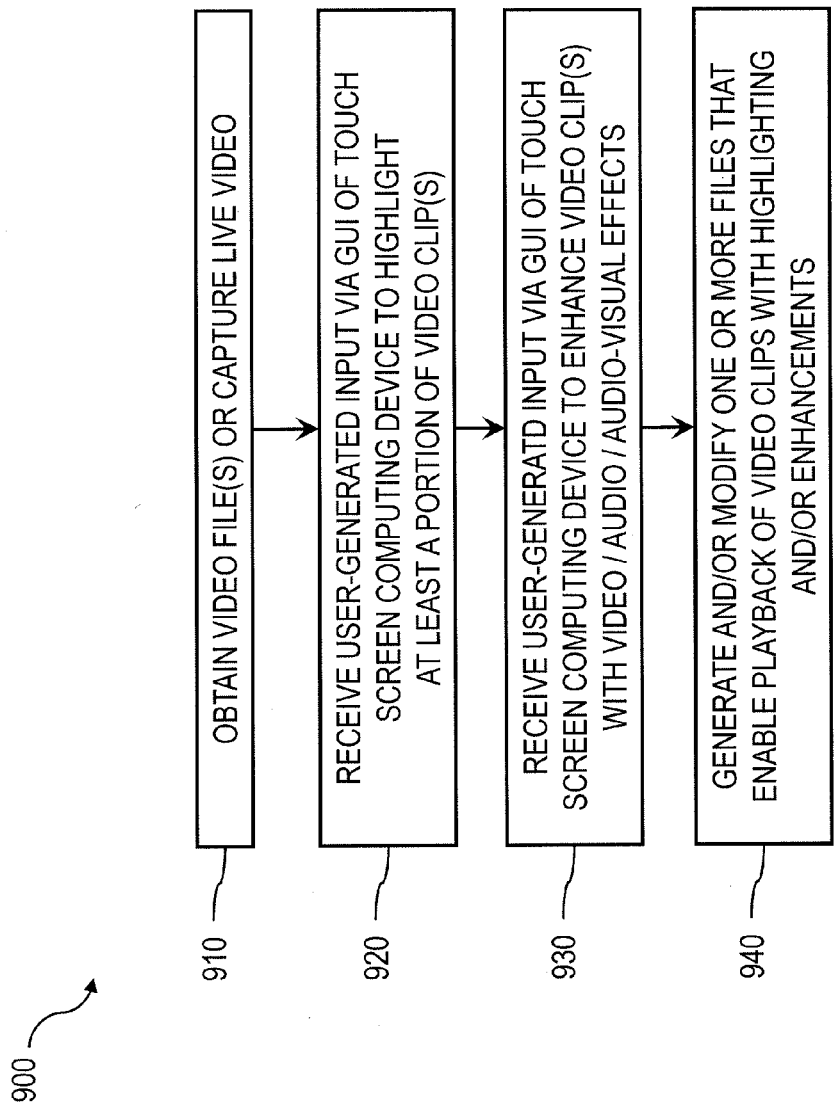
FIG. 9 is a process flow diagram illustrating a sample workflow using a video editing, enhancement, and distribution platform.

FIG. 9 is a process flow diagram 900 illustrating in which, at 910, video files are obtained (either locally on a mobile device or from a remote source) or are generated directly on the mobile device (i.e., a live video feed is captured). Thereafter, at 920, a graphical user interface can be presented to the user of the mobile device via which the user can highlight video clips (or portions thereof) corresponding to the video files/captured video. In addition, optionally, at 930, the user can, via the graphical user interface, make other enhancements to segments of the video clips corresponding to the highlights. Such enhancements can vary widely and can include, for example, visual effects, audio visual effects, transitions and the like. Thereafter, at 940, once the highlighting and/or enhancements are finalized, one or more files can be generated and/or modified that enable the playback of the video clips with the highlighting and/or enhancements.

The functionality described herein can be provided in a client application, a back-end application or a combination of both. In some cases, video clips are uploaded first a lower resolution to allow for more immediate transfer of the related information. This can be followed by a subsequent upload of a higher resolution version of the corresponding video clip. In this regard, one use example is that a user would like to share video clips in near-real-time to his or her social network via FACEBOOK. A quick upload that complies with the upload restrictions of FACEBOOK and/or which is optimized for a mobile phone can be used to ensure prompter sharing of the video clip. The client application and/or the back-end server can later upload a high resolution version of the video clip. This subsequent uploading can occur a slower rate, as a background process, or during certain time periods (e.g., nighttime, etc.).

Various aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, functional programming language, logical programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and an interface such as a touch screen and/or a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and/or described herein do not require the particular order shown, or sequential order, to achieve desirable results. In addition, it will be appreciated that while the current subject matter is optimized for computing devices with touch screen interfaces, certain aspects can also be implemented on computing devices having interfaces other than touch screens. Other embodiments may be within the scope of the following claims.

What is claimed is:

1. A method comprising:
   presenting, in a graphical user interface on a mobile device having a touch screen interface, a window displaying at least one video clip and at least one highlight element;
   receiving user-generated input via the graphical user interface selecting one highlight element during display of the at least one video clip;
   displaying, in response to the user-generated input, at least one thumbnail corresponding to a segment of the video clip being displayed, the thumbnail being displayed concurrently with the window in the graphical user interface, and displaying a plurality of audio effects elements and an adjustable volume control element, wherein each audio effect element corresponds to audio effects to be applied to the segment of the at least one video clip;
   receiving, via the graphical user interface, user-generated input selecting at least one thumbnail and at least one audio effects element, and receiving user-generated input during playback of the at least one video clip varying a level of the adjustable volume control element;
   generating or modifying a video file comprising, for at least one of the thumbnails, the corresponding segment of the video clip with audio effects corresponding to the selected at least one audio affects element to the segment corresponding to the selected at least one thumbnail, and with varying the volume levels of an audio portion of the at least one video clip according to the varied level of the adjustable volume control element, wherein during subsequent playbacks of the generated or modified video file, the generated or modified video file contains the applied audio effects and varied volume levels;
   first uploading the video file at a lower level resolution to a social network platform; and
   second uploading the video file at a higher level resolution to the social network platform, the higher level resolution video file being uploaded to social network platform as a background process.

2. A method as in claim 1, wherein the at least one highlight element comprises an instant highlight element, the instant highlight element, when activated, causes at pre-defined time period of the video clip prior to such activation to be marked as a highlight with a corresponding thumbnail.

3. A method as in claim 1, wherein the at least one highlight element comprises a start highlight element, the start highlight element, when first activated, marks a first point a time, and when second activated marks a second point of time, the first point of time and the second point of time defining a time period for a highlight, the highlight having a corresponding thumbnail.

4. A method as in claim 1, wherein the window displaying the at least one video clip displays a video feed as it is being captured by a camera on the mobile device, and wherein the at least one thumbnail overlays the presented at least one video clip.

5. A method as in claim 1, wherein the window displaying the at least one video clip displays a previously generated video file.

6. A method as in claim 5, further comprising:
presenting, in the graphical user interface, a plurality of thumbnails corresponding to each of a plurality of available video clips; and
receiving user-generated input, via the graphical user interface, an ordered selection of two or more of the thumbnails, the selected ordering being used to concatenate video clips corresponding to the thumbnails during the display of the at least one video clip.

7. A method as in claim 1, wherein the graphical user interface comprises a timeline that is displayed concurrently with the display of the at least one video clip, the timeline providing a visual characterization of temporal advancement of the at least one video clip.

8. A method as in claim 1, further comprising:
displaying at least one visual effects palette in the graphical user interface comprising a plurality of visual effects elements, each visual effects element corresponding to visual effects to be applied to a segment of the at least one video clip; and
receiving, via the graphical user interface, user-generated input selecting at least one thumbnail and at least one visual effects element;
wherein the generated or modified file applies visual effects corresponding to the selected at least one visual effects element to the segment corresponding to the selected at least one thumbnail.

9. A method as in claim 8, wherein the visual effects corresponding to each visual effects element are selected from a group consisting of: reduced playback speed, increased playback speed, at least one replay of the segment, at least one visual overlay, and at least one change of color of the segment.

10. A method as in claim 1, further comprising:
displaying at least one transitions palette in the graphical user interface comprising a plurality of transition elements, each transition element corresponding to transition effects to be applied when transitioning between segments of the at least one video clip; and
receiving, via the graphical user interface, user-generated input selecting at least one pair of thumbnails and at least one transition element;
wherein the generated or modified file applies transition effects corresponding to the selected at least one transition element between the segments corresponding to each segment of the at least one pair of thumbnails.

11. A method as in claim 10, wherein the transition effects are selected from a group consisting of: fade to black effect, cross dissolve effect, jump cut effect, jump to black effect, slide left effect, slide right effect, zoom in effect, a zoom out effect, a zoom and slide left effect, and a zoom and slide right effect.

12. A method as in claim 1, further comprising one or more of:
transmitting data characterizing the generated or modified video file, displaying data characterizing the generated or modified video file, storing data characterizing the generated or modified video file, and uploading data characterizing the generated or modified video file to at least one social network platform.

13. A method as in claim 1, wherein the generated or modified video file comprises a unitary data file.

14. A method as in claim 1, wherein the generated or modified video file is generated from at least two separate data files.

15. A non-transitory computer program product storing instructions, which when executed by at least one data processor forming part of at least one computing system, result in operations comprising:
presenting, in a graphical user interface on a mobile communications device having a touch screen interface, a window displaying at least one video clip and at least one highlight element;
receiving user-generated input via the graphical user interface selecting one highlight element during display of the at least one video clip;
displaying, in response to the user-generated input, at least one thumbnail corresponding to a segment of the video clip being displayed, the at least one thumbnail being displayed over a portion of the at least one video clip as it is being displayed in the window in the graphical user interface;
displaying at least one visual effects palette in the graphical user interface comprising a plurality of visual effects elements, each visual effects element corresponding to visual effects to be applied to the segment of the at least one video clip;
displaying at least one audio effects palette in the graphical user interface comprising a plurality of audio effects elements and an adjustable volume control element, wherein each audio effect element corresponds to audio effects to be applied to the segment of the at least one video clip;
receiving, via the graphical user interface, user-generated input selecting at least one thumbnail and at least one visual effects element;
receiving, via the graphical user interface, user-generated input selecting at least one thumbnail and at least one audio effects element, and receiving user-generated input during playback of the at least one video clip varying a level of the adjustable volume control element;
displaying a visual effects element icon corresponding to the selected at least one visual effects element overlaid on the selected at least one thumbnail; and
generating or modifying a video file comprising, for at least one of the thumbnails, the corresponding segment of the video clip with visual effects corresponding to the selected at least one visual effects element corresponding to the selected at least one thumbnail, and with audio effects corresponding to the selected at least one audio affects element to the segment corresponding to the selected at least one thumbnail, and with variable volume levels of an audio portion of the at least one video clip according to the varied level of the adjustable volume control element, wherein during subsequent playbacks of the generated or modified video file, the generated or modified video file contains the applied audio effects and varied volume levels.

16. A computer program product as in claim 15, wherein the operations further comprise one or more of:
transmitting data characterizing the generated or modified video file, displaying data characterizing the generated or modified video file, storing data characterizing the generated or modified video file, and uploading data characterizing the generated or modified video file to at least one social network platform.

17. A system comprising:
at least one data processors; and
memory storing instructions, which when executed by at the least one data processor, result in operations comprising:

presenting, in a graphical user interface on a mobile device having a touch screen interface, a window displaying at least one video clip and at least one highlight element;

receiving user-generated input via the graphical user interface selecting one highlight element during display of the at least one video clip;

displaying, in response to the user-generated input, at least one thumbnail corresponding to a segment of the video clip being displayed, the at least one thumbnail being displayed over a portion of the at least one video clip as it is being displayed in the window in the graphical user interface, and displaying a plurality of audio effects elements and an adjustable volume control element, wherein each audio effect element corresponds to audio effects to be applied to the segment of the at least one video clip;

displaying at least one transitions palette in the graphical user interface comprising a plurality of transition elements, each transition element corresponding to transition effects to be applied when transitioning between segments of the at least one video clip; and receiving, via the graphical user interface, user-generated input selecting at least one pair of thumbnails and at least one transition element, and receiving user-generated input selecting at least one thumbnail and at least one audio effects element, and receiving user-generated input during playback of the at least one video clip varying a level of the adjustable volume control element;

displaying a transition element icon corresponding to the selected at least one transition element disposed adjacent to the selected at least one pair of thumbnails; and generating or modifying a video file comprising, for at least one of the pair of thumbnails, the corresponding segment of the video clip, wherein the generated or modified file applies transition effects corresponding to the selected at least one transition element between the segments corresponding to each segment of the at least one pair of thumbnails, applies audio effects corresponding to the selected at least one audio affects element to the segment corresponding to the selected at least one thumbnail, and applies variable volume levels of an audio portion of the at least one video clip according to the varied level of the adjustable volume control element, wherein during subsequent playbacks of the generated or modified video file, the generated or modified video file contains the applied audio effects and varied volume levels.

18. A system as in claim 17, wherein the operations further comprise one or more of:

transmitting data characterizing the generated or modified video file, displaying data characterizing the generated or modified video file, storing data characterizing the generated or modified video file, and uploading data characterizing the generated or modified video file to at least one social network platform.

\* \* \* \* \*